United States Patent [19]
McCann et al.

[11] Patent Number: 5,246,164
[45] Date of Patent: Sep. 21, 1993

[54] METHOD AND APPARATUS FOR VARIABLE APPLICATION OF IRRIGATION WATER AND CHEMICALS

[76] Inventors: Ian R. McCann, Department of Agricultural Engineering University of Idaho, Moscow, Id. 83843; Jeffrey C. Stark, Research and Extension Center University of Idaho, Aberdeen, Id. 83210

[21] Appl. No.: 808,513

[22] Filed: Dec. 16, 1991

[51] Int. Cl.⁵ .................... A01C 23/04; A01G 25/09; B05B 17/00
[52] U.S. Cl. ........................................ 239/11; 239/73; 239/170; 239/727; 239/729
[58] Field of Search ................... 239/1, 10, 11, 71, 73, 239/74, 170, 727-729

[56] References Cited

U.S. PATENT DOCUMENTS

| | | | |
|---|---|---|---|
| 3,901,442 | 8/1975 | Chapman | 239/99 |
| 4,630,773 | 12/1986 | Ortlip | 239/1 |
| 4,662,563 | 5/1987 | Wolfe, Jr. | 239/1 |
| 4,729,514 | 3/1988 | Ostrom et al. | 239/727 |
| 4,763,836 | 8/1988 | Lule et al. | 239/727 |
| 4,878,614 | 11/1989 | Hach et al. | 239/10 |
| 4,993,634 | 2/1991 | Hach et al. | 239/10 |
| 5,050,771 | 9/1991 | Hanson et al. | 239/1 |

FOREIGN PATENT DOCUMENTS 202847  11/1986  European Pat. Off. ............ 239/728

OTHER PUBLICATIONS

Farming Soils—Not Fields by Tom DeLuca, *The Leopold Letter*, The Leopold Center for Sustainable Agriculture, Iowa State Univ., Ames, Iowa, pp. 2-8, 1991.

*Primary Examiner*—Andres Kashnikow
*Assistant Examiner*—Lesley D. Morris
*Attorney, Agent, or Firm*—Frank J. Dykas; Craig M. Korfanta; Ken J. Pedersen

[57] ABSTRACT

Disclosed are a method and apparatus (10) for cataloging or dividing a given field, under irrigation by an irrigation system (100), into a plurality of zones which can be monitored for irrigation water and chemical requirements and then, delivering by way of the irrigation system, the appropriate amount of irrigation water and/or chemicals to each zone as so defined. Each of the sprinkler assemblies (105) is independently controlled by a solenoid operated valve (16), responsive to a control module (15). The control modules (15), in turn, are electronically interconnected with a data acquisition and control unit (12) which is capable of sending to the control modules (15) coded signals for either activating the sprinkler head (105) or deactivating each individual sprinkler head (105). A microprocessor (11) is provided which is programmed to determine the current position of each independent sprinkler assembly (105), to generate maps from field data or digital images, and to test for map positions which correspond to the current sprinkler positions and return the water or chemical application requirements as portrayed on the map. The microprocessor (11) then sends this information to the data acquisition and control system (12), which in turn sends these signals to the various control modules (15).

30 Claims, 5 Drawing Sheets

METHOD AND APPARATUS FOR VARIABLE APPLICATION OF IRRIGATION WATER AND CHEMICALS

BACKGROUND OF THE INVENTION

1. Technical Field

This invention generally relates to an irrigation apparatus for variable water and chemical application, and more particularly to an automatic control system for irrigation machinery for variable water and chemical application in a field, dependent upon varying criteria within the field.

2. Background Art

The use of sprinkler irrigation equipment has, for many years, been one of the most effective and efficient methods of providing irrigation water to growing crops. Technological advances and developments with regard to irrigation equipment have enabled farmers to pump water from whatever source, such as reservoir, irrigation canal, river or water well, through a main irrigation pipeline, to an irrigation system for distribution across the field. Some of the irrigation equipment in common use today can generally be categorized as follows: continuously moving systems, such as center pivot systems, linear line systems, solid set sprinkler line, and wheel lines.

The center pivot system usually embodies a buried main supply line through which irrigation water is pumped, under pressure, to a fixed central pivot tower and up through some sort of a sealed rotatable coupling to a horizontal sprinkler header line which extends radially out from the center pivot assembly. The horizontally oriented sprinkler header line is supported by a plurality of movable support towers, such that the header line can be rotated about the center pivot tower. A plurality of sprinkler assemblies are connected to outlets at spaced intervals along the main line, thus forming a fixed array which is movable. When the main irrigation water supply line and irrigation line are pressurized with a supply of irrigation water, the sprinklers operate automatically to sprinkle the water out over zones of the field located beneath the sprinklers. There are two types of sprinklers in common use today, the first is the impact sprinkler which requires a relatively high pressure supply of water and a spring-loaded rocker baffle, which repeatedly impinges upon the flow of water from the sprinkler nozzle to break it into droplets, with the momentum of the baffle impacts being used to rotate the sprinkler head about a central axis. The second type of sprinkler assembly uses passive baffle plates, wherein a stream of water is discharged through a nozzle and impinges upon a fixed or rotating distribution baffle which disperses the water over the zonal surface area below the pivot irrigation line.

While pivot irrigation systems can be sized to irrigate a circular or arcuate section of a field of virtually any size, typically they are sized to irrigate fields of approximately 160 acres. These are one-half mile in length and are commonly called quarter sections, and utilize ten to fifteen movable towers supporting a main sprinkler header having between 100 and 150 sprinkler assemblies. By its inherent design, the ground speed of the sprinkler header line increases the farther away from the center point, and as a result the nozzles through which the water passes from the main header to the sprinkler assemblies are sized to deliver the least flow rate of water close to the center pivot assembly, and the most water at the farthest point along the main header, so that the radial distribution of water along the line from the center pivot assembly to the outermost nozzle is uniform. For purposes of this disclosure, this shall be referred to as "uniform radial distribution of water". Please see prior art FIG. 4.

The total amount of water, delivered by the distribution system across the field, is determined by the rate of rotation of the pivot towers. Commonly, each of the movable towers is supported by two to four wheels, at least one of which is driven by an electrical or hydraulic motor using some sort of a gear reduction system to synchronize the speeds of the towers, with the outermost towers traveling fastest, and the innermost the slowest. While it is possible to provide variable speed motors to adjust the angular rotation rate of the tower assemblies to either increase or decrease the speed at which the tower assemblies rotate, in practice the preferred commercial method of achieving this goal is to operate or move the tower assemblies intermittently from angular position to position around the field. Typically this is accomplished by use of an electrical control system which turns on and off the electrical motor of the outermost tower to rotate this tower. The electrical motors of the intermediate towers are controlled by a set of electromechanical switches which turn on and off to keep the intermediate towers in alignment with the outermost tower as it travels around the field. Power to each of the tower motors is provided by means of a common line strung parallel to the sprinkler header and energized through a slip ring assembly at the pivot center tower. If the center pivot assembly is to operate at maximum speed, the electrical power system for the outermost tower is on at all times, and to operate at half speed, a 50% cycle would be utilized wherein the electrical motor at the outermost tower is energized 50% of the time, for example, 30 seconds out of every 60 seconds, thus causing the pivot assembly to move at intermittent intervals, resulting in an average rotation of half of full speed.

The second common type of continuously moving self-propelled system is the linear move system, wherein a main irrigation water supply line is positioned along one side of the field, and a sprinkler header, supported at spaced intervals by movable towers and/or wheels extends out normal to the main irrigation line and transverse across the field. As with the center pivot irrigation system, a plurality of sprinkler assemblies are provided at spaced intervals along the sprinkler header. Hydraulic connection between the main irrigation supply system and the sprinkler header is commonly provided by means of a suction pipe in a canal, or a flexible connecting line which connects the inlet of the sprinkler header to any one of a plurality of main line connectors which are spaced at intervals along the main supply line. The transverse sprinkler and sprinkler header assembly, with the sprinklers in a line abreast formation, is then linearly advanced across the field while being supplied with pressurized water. More technologically advanced linear systems utilize two flexible line connectors which are automatically connected to the main line discharge headers one after the other in leap-frog fashion.

The third irrigation system relevant to which the present invention is the stationary irrigation system, which is essentially a lattice grid of fixed irrigation pipe connected to a main irrigation supply line and having a plurality of spaced apart risers and sprinkler heads for distributing water over the field. In these systems, the main irrigation supply line functions as a supply manifold, with each of the fixed sprinkler header lines having a supply valve which opens and closes to supply water to its appendant sprinkler heads.

A fourth type of irrigation system is really a hybrid combination between the linear move system and the stationary, and is called the wheel line irrigation system. Like the linear move system, the wheel line irrigation system utilizes a main irrigation water supply line positioned along one side of the field and a sprinkler header, supported at spaced intervals by wheels which typically use the sprinkler header as a common axle for movement transversely across the field. Unlike the linear move system though, the wheel line is moved, usually by a gasoline engine, from one mainline connector position to the next, and then stopped and held stationary while irrigating a particular transverse zone of the field. In this aspect, the wheel line system is similar to the solid set in that the sprinklers are stationary at the time that water is being distributed across a particular zone of the field.

Each of these systems is designed for, and often times incorporates, features enabling the introduction of chemicals, be they fertilizers, pesticides or other types of agricultural chemicals, into the irrigation water being sprinkled over the field. In practice, it is quite common to introduce nitrates, nitrogen and phosphorous fertilizer, usually in the form of a liquid solution into the irrigation water as the field is being irrigated.

In all four systems, one of the important design parameters is the ability to deliver a uniform supply of water across the entire field. The problem, however, is that it is not necessarily appropriate to uniformly distribute irrigation water, and/or chemicals, across the entire field. Large agricultural fields often times present varying conditions, both as to soil type, texture, topography, drainage, and insect and weed population density. For example, in large fields, one portion of the field may contain thin sandy soil which does not have the capacity to hold large quantities of water or chemicals, and from which water drains easily, and another portion of the field, usually at the bottom of a drainage, which may contain a deeper sand, clay and silt mixture for soil, which drains poorly and holds water and chemicals for a longer period of time. In such cases, if water is distributed by the irrigation system uniformly across the field, the farmer will be faced with the dilemma of having too little water in one portion of the field and too much at the other, if the farmer applies water at a rate equal to the average required over the field. The farmer will not usually do this, since it is an economic necessity that the farmer maximize the economic return from the field. As a result, the farmer will instead often irrigate the entire field at the rate required for the most deficient soil in the field. This is a waste of precious water and the energy needed to pump it. Additionally, this might result in a decreased yield trade off between crop losses caused by under watering a portion of the field as opposed to over watering another portion.

The problems so encountered are further compounded with the use of chemical fertilizers and pesticides, wherein deficient portions of the field soil require extra fertilizer or pesticide. If the farmer markes a uniform application of agricultural chemicals based on the requirements of the deficient soil, it will result in over application in portions of the field. This is a waste of resources and money and often times will result in the leaching of soluble and mobile and chemicals into ground water or waste water recovery systems.

The goal for the farmer in today's competitive market is to apply the correct amount of water and the correct amount of fertilizers, herbicides and other chemicals to the crops as needed, and where needed.

DISCLOSURE OF INVENTION

Accordingly, it is an object of this invention to provide a method and apparatus for cataloging or dividing a given irrigation field under irrigation by an irrigation system into a plurality of zones which can be monitored for irrigation water and chemical requirements and then delivering by means of the irrigation system the appropriate amount of irrigation water and/or chemicals to each zone as so defined.

These objects are accomplished by use of an irrigation system having a plurality of sprinkler assemblies oriented in a fixed array relative to each other, either for pivotal rotation about a central pivot tower, or for linear movement along the length of the field in either a linear move or wheel line system, or in a fixed, solid lattice grid of irrigation water sprinkler pipe. Each of the sprinkler assemblies is independently controlled by means of a solenoid operated valve, responsive to a control module. The control modules, in turn, are electronically interconnected with a data acquisition and control unit which is capable of sending to the control modules coded signals for either activating the sprinkler head or deactivating each individual sprinkler head.

A microprocessor and data acquisition system are provided which is capable of having field data or digital images input for processing. Also provided are sprinkler line position sensors, ground speed sensors and sprinkler line pressure sensors for inputting additional data to the microprocessor. The microprocessor is programmed to determine the current position of each independent sprinkler assembly, to generate maps from the field data or digital image, and to test the map positions which correspond to the current sprinkler positions and return the water or chemical application requirements as portrayed on the map. The microprocessor then inputs this information to the data acquisition and control system, which in turn completes the loop by sending signals to the various control modules.

BEST MODE FOR CARRYING OUT INVENTION

Figure 1:
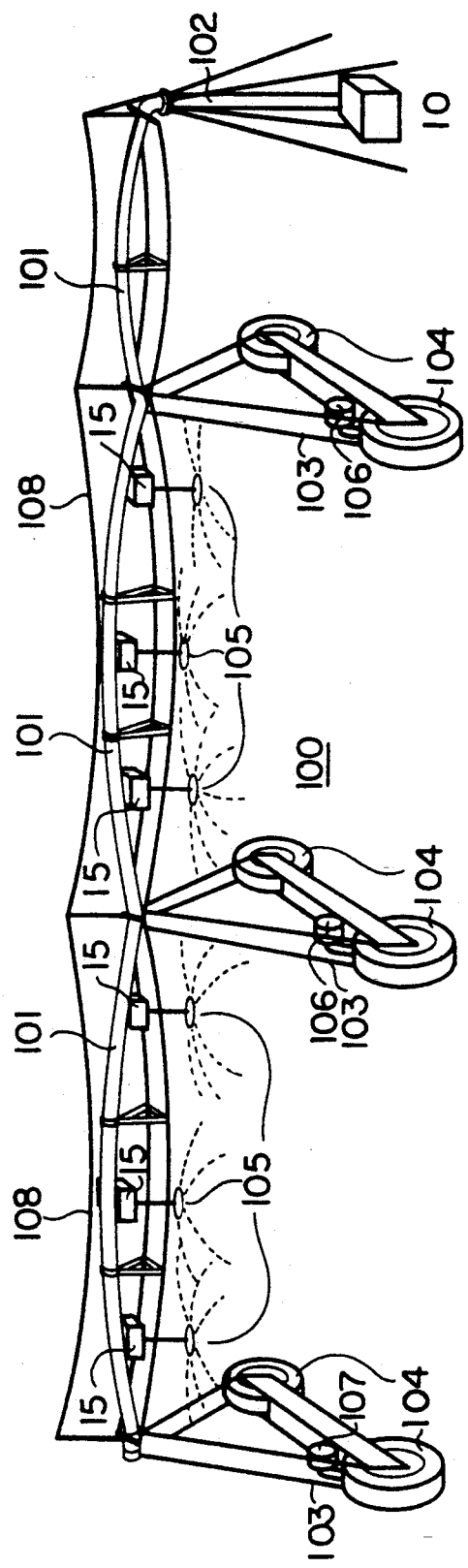
FIG. 1 is a representational diagram of a pivot irrigation sprinkler using my control system.

With reference to the figures, a first embodiment of my variable application sprinkler irrigation control system 10 is illustrated along with an arrangement of steps for implementing the control method. As shown in FIG. 1, sprinkler irrigation control system 10 is here incorporated into a pivot sprinkler system 100, having horizontally oriented sprinkler header line 101 with one of its ends pivotally attached to a center pivot tower 102. Sprinkler header 101 is supported at regular intervals by support and drive towers 103. These towers also act to drive the sprinkler header in a radial path around center pivot tower 102 by pairs of cambered drive wheels in connection with drive motors 106, with drive motor 107, for the outermost tower, being the control tower for intermittent operation and the drive systems of the remaining towers being controlled by means of electromechanical devices, not shown, which monitor the angular relation between towers to energize the drive motors to bring the towers into alignment with the outer most tower. All of the tower drive systems are served by a common electrical power line 108, typically of 220 V or 440 V, strung alongside of sprinkler header 101 and receiving power through a slip ring assembly at the pivot center. As will be described later in this section of the specification, this common power line 108 will also provide a convenient signal path and source of power for control modules 15.

A plurality of sprinkler assemblies 105 are attached at regular intervals to the sprinkler header 101, thereby forming a fixed array for distributing water and chemicals over the ground and growing crop.

Figure 2:
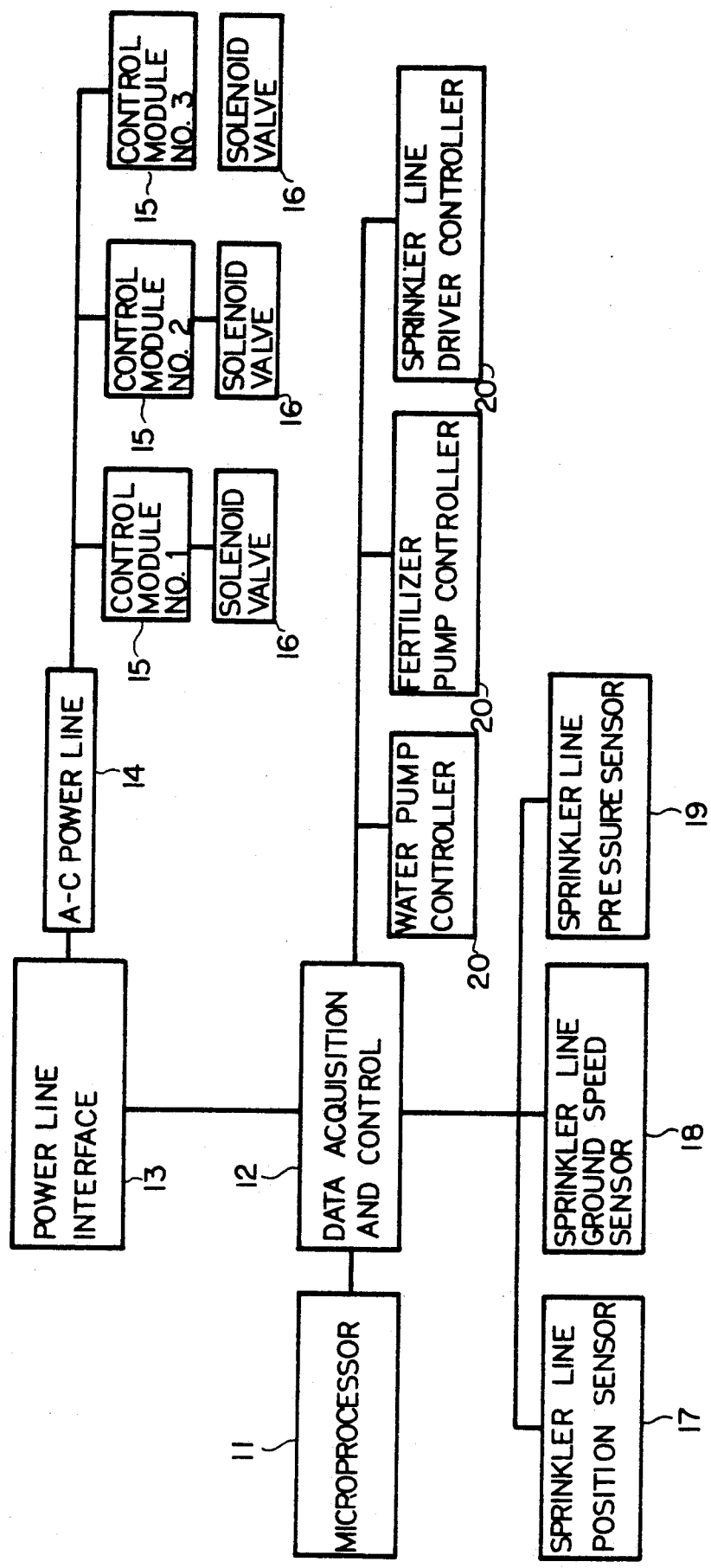
FIG. 2 is a schematic diagram of one embodiment of my spatial irrigation control system.

As shown in FIGS. 1 and 2, the sprinkler irrigation control system 10 is positioned at the center pivot tower 102 and is electrically connected to the sprinkler system 100 at a variety of points for receiving and transmitting from and to the various components of both the sprinkler system 100 and the sprinkler irrigation control system 10. In particular, the sprinkler irrigation control system 10 has a microprocessor 11, typically a portable personal computer, interfaced with a data acquisition and control device 12. Data acquisition and control device 12 receives input from at least one sprinkler line position sensor 17, and in this preferred embodiment from sprinkler line ground speed sensor 18 and sprinkler line pressure sensor 19 as well. The data acquisition and control device 12 relays the sprinkler line position information back to microprocessor 11 for reasons which will become apparent further on in this description. Data acquisition and control device 12 is further connected to the water pump controller 20, fertilizer pump controller 21 and sprinkler line driver controller 22, either directly or through additional X-10 control modules. Each of these controllers, 20, 21 and 22, is configured to regulate their respectively controlled devices in response to signals received from the microprocessor 11 through the data acquisition and control device 12. Sprinkler line driver controller 22 replaces the normal timer circuits utilized to control intermittent operation of the outer most tower drive system 107 and, in the preferred embodiment, functions in a similar manner to provide intermittent operation of the outer most tower drive system to produce an average speed for the center pivot line. Water pump controller 20 is provided for purposes of regulating main line water pressure in view of fluctuations in pressure caused by variations in the number of sprinkler assemblies in operation at any given time. There are a variety of devices and systems for regulating main line water pressure, including bypass circuits, variable speed pump motors and throttle valves, amongst others. Fertilizer pump controller 21 is provided for precisely its stated purpose, turning on and off a fertilizer pump, or otherwise regulating the rate of introduction of fertilizer into the irrigation system.

The data acquisition and control device 12 is also connected to a power line interface 13 which is of standard design and is enabled to send carrier current information over the A-C power supply line 108 as shown in FIG. 1 and as 14 in the block diagram of FIG. 2, which drives the electric motors for drive wheels 104. Each sprinkler head 105 is connected to the sprinkler header 101 through a solenoid valve 16. These solenoid valves 16 are each in turn controlled by control modules 15 which are connected to the A-C power supply line 14. Control modules use the X-10 protocol to receive information from the microprocessor 11 through the data acquisition and control device 12 and power line interface 13, both of which are X-10 compatible.

The control modules 15, power line interface 13 and data acquisition and control device 12 are all currently manufactured in 120 V versions and available from X-10 POWERHOUSE who specializes in power line transmission technology. However, with slight design changes, similar units can be easily constructed which will handle the 220 V or 440 V present on most sprinkler irrigation systems. Alternatively, a single 120 V line can be installed on the sprinkler system to accommodate "off-the-shelf" components.

Microprocessor 11 uses spatial information concerning the topography, soil texture and depth, soil nutrient distributions, weed and insect distributions and various other parameters to control the amounts of water, fertilizer, and pesticides which are applied to any particular zone within the irrigation area. The control process consists of inputting the spatial data into the microprocessor 11, generating zone definitions and a zone map within the microprocessor 11 by processing the spatial data.

Figure 5:
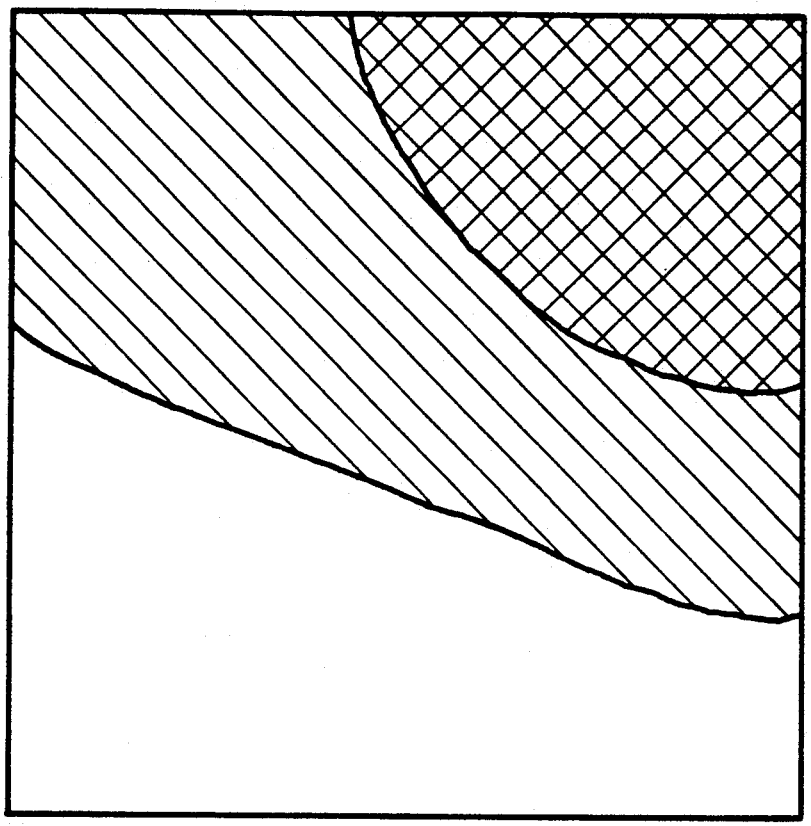
FIG. 5 is a representational drawing showing a zonal map of the moisture in an irrigated field.
Figure 4:
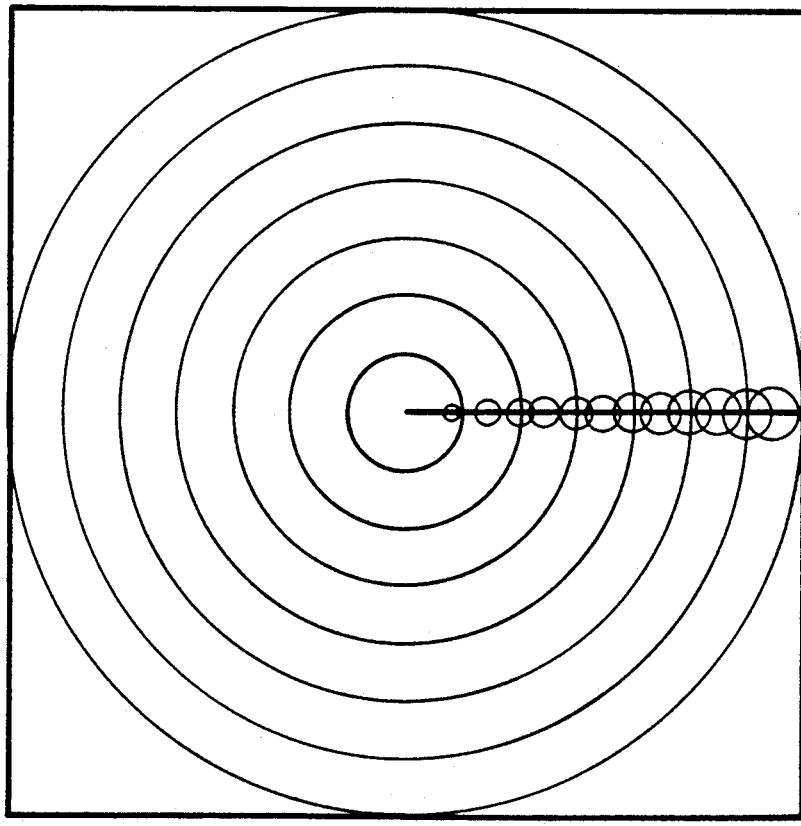
FIG. 4 is a schematical representational plan view of a prior art sprinkler system showing uniform radial distribution of water.
Figure 6:
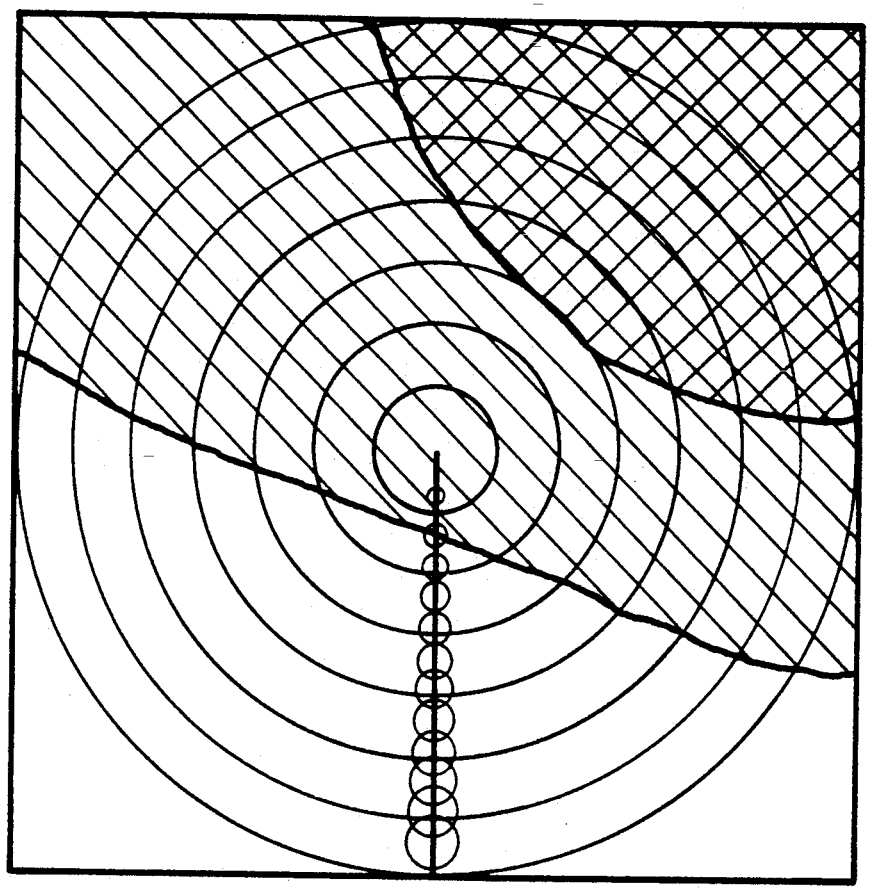
FIG. 6 is a representational zonal map showing the sprinkler assembly zonal locations relative to the zonal distribution of moisture throughout the field.

FIG. 5 shows, in conceptual format, the generation of such a map, with the unhatched area representing a dry portion of the field, the single diagonal line hatched area representing an intermediate moisture content, and the double hatched area a portion of the field having high moisture content. The next step is generating individual sprinkler control codes by getting the current sprinkler positions and testing the zone map for the corresponding zones, transmitting the sprinkler control codes to the control modules 15 and repeating the previous two steps for the length of the sprinkler cycle. This is conceptually shown in FIGS. 3 and 6.

Each individual sprinkler head 105 can be shut off or turned on independent of any other. Additionally, the main water pump, fertilizer pump and the sprinkler system speed can be controlled by the microprocessor 11 through controllers 20, 21 and 22. The amount of water, fertilizer, or pesticides applied is a function of the number of active sprinkler heads 105, the volume of the water and fertilizer pumped, and the ground speed of the sprinkler system.

The spatial data can be generated automatically, manually or by a combination of the two. One of the most promising automatic methods is through the use of multi spectral aerial photography, such as infra-red imagery. These photographic images are then digitized and loaded into the computer in either raster or vector based format and subsequently processed by the computer. By doing a contrast/intensity analysis, the various topological zones can be identified as to their specific water and fertilizer needs. Additionally, a mapping program within the microprocessor 11 provides a means of manipulating the images to custom tailor a definition map as conditions warrant or to generate an entire map from manually acquired data. Format conversion routines, both vector to raster and raster to vector through autotracing, can be provided to simplify the user interface.

Manual methods of generating spatial data would include soil sampling in a regular grid pattern to determine variations in soil physical and chemical characteristics. Field data would subsequently be used to generate digitized images that map the spatial distribution of characteristics such as soil depth, texture, nutrient concentrations, etc. Additionally, spatial distributions of weed and insect populations could be used to map specific zones for variable rate pesticide application.

The particular method of sprinkler control code generation depends on both the map format, vector or raster based, and whether the sprinkler system is of the center pivot, linear or stationary type. The center pivot sprinkler configuration lends itself to a polar coordinate based analysis while the linear and stationary configurations are better analyzed using cartesian coordinates. Additionally, in an alternative embodiment, a scaled down microprocessor is used to send groups of sprinkler control codes. In this embodiment, all of the sprinkler control codes are predetermined by a full scale personal computer and then loaded in batch form into the scaled down microprocessor, thereby eliminating the need to have a personal computer available in the field for each sprinkler system.

Figure 3:
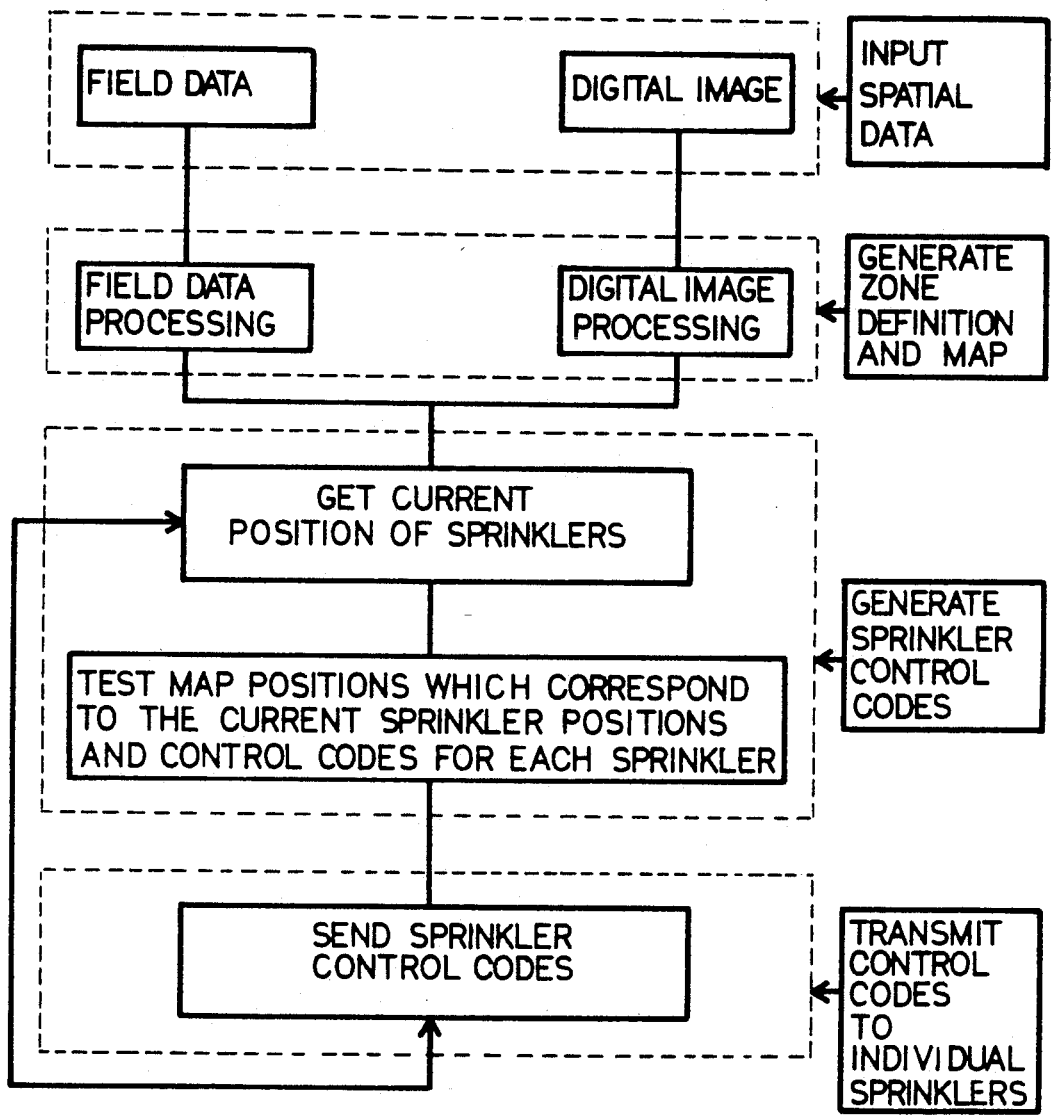
FIG. 3 is a flow chart illustrating one possible set of steps for carrying out my control method.

As shown in FIGS. 2 and 3, microprocessor 11 determines the zonal position of each sprinkler assembly, and compares it to the requirements for water and/or chemicals for that particular zone within the field, it, through data acquisition control device 12 and power line interface 13, sends a signal through AC power line 14 to the control module for that particular sprinkler, either effecting a turn on or off of solenoid valve 16. Appropriate coding programming can be generated to interrelate pivot speed and sprinkler assembly active on time, and main line pump pressure, so as to maximize efficiency and minimize operating costs and wear and tear on the mechanical equipment. For example, in a zonal alignment wherein a fixed array of sprinkler assemblies are all aligned in zones requiring reduced water requirement of 50% of full watering, and the pivot is running at half speed, rather than closing off solenoid valves 16 intermittently for half of the time the pivot traverses through this zonal portion of the field, instead, all solenoid valves 16 can be opened and the pivot speed increased to full speed to reduce the time in that particular zonal portion of the field. In a like manner, if the radial alignment of the pivot is such that it is in a portion of the field not requiring watering, or wherein only a few sprinkler assemblies are in operation, then the irrigation pump can be turned off during this traverse, or pressure can be reduced to only that which is necessary to provide water to the few operating sprinkler assemblies.

Control of the speed of the sprinkler assembly is not necessary in the case of solid set irrigation systems and wheel lines, since in both cases, the sprinkler assemblies are stationary at the time the irrigation is actually being accomplished. In such systems, the only sprinkler assembly control necessary is the timing when the sprinkler assembly is on and when the sprinkler assembly is off.

A third embodiment of the sprinkler assemblies involves the use of paired sprinklers. In this embodiment, two sprinkler heads are provided in lieu of the standard single sprinkler head. Each is sized such that when both are operating simultaneously, the full volume of water is delivered to the particular radial zone through which the pivot rotates. One of the sprinkler heads is designed to deliver one-third of the total quantity of water, the other, for two-thirds of the total quantity. In this preferred embodiment, each sprinkler is mounted to a cross bar which is mounted perpendicular to the sprinkler header so that each sprinkler distributes water over the same radial or linear zone of the field. If each of the sprinkler heads is independently controlled, the sprinkler system is capable of four different watering settings, that being no water to that zone, one-third water, two-thirds water, or full watering. Corresponding proportions of fertilizer or pesticides could be applied in a similar manner.

A fourth embodiment of the sprinkler assemblies involves the use of variable flow rate sprinklers. In this embodiment, variable flow rate nozzles are used in conjunction with the sprinklers. The control modules 16 must be adjusted to include not only an on and off function, but also signals for rate settings for the flow rate control device.

Additionally, the current X-10 control modules, which were originally designed to control 120 V appliances, lend themselves to incremental control of a solenoid through their dimmer circuitry. Using this feature coupled with an incremental or infinitely variable sprinkler valve, one could generate any desired volume flow from each sprinkler head.

In a like manner, my new method and control system can be applied to linear sprinkler irrigation systems and to stationary sprinkler pipe and wheel line irrigation systems. It should be apparent to one skilled in the art that the present control system can easily be adapted for use with these alternative designs.

While there is shown and described the present preferred embodiment of the invention, it is to be distinctly understood that this invention is not limited thereto but may be variously embodied to practice within the scope of the following claims.

I claim:

1. An apparatus for variable application of irrigation water to a plurality of zones within a field of ground to be irrigated which comprises:
   a plurality of independently operable sprinkler assemblies oriented in a fixed array relative to each other, with each of said sprinkler assemblies being operable to distribute an adjustable amount of water over a zone of ground;
   means for delivering water to each of the sprinkler assemblies in the fixed array;
   means for moving the fixed array of sprinkler assemblies over the ground; and
   control means operatively connected to the plurality of sprinkler assemblies and the means for moving the fixed array, for controlling the distribution of water over the zones of ground and variably adjusting the amount of water applied within the zones, said control means including:
   (a) ground mapping means for inputting information concerning irrigation requirements for a plurality of zones within the ground to be irrigated;
   (b) sprinkler assembly locator means for identifying the zonal position of each of the sprinkler assemblies in the fixed array as the fixed array is moved across the ground; and (c) means responsive to the ground mapping means and the sprinkler assembly locating means, for adjusting the amount of water distributed from each of the sprinkler assemblies as they distribute water over zones of ground.

2. The apparatus of claim 1 wherein the means of controlling the distribution of water over the zones of ground further comprises means for selectively operating each sprinkler assembly.

3. The apparatus of claim 1 wherein the means of controlling the distribution of water over the zones of ground further comprises:

means for selectively adjusting the speed at which the means for moving the fixed array moves the fixed array over the ground.

4. The apparatus of claim 1 which further comprises: means for admixing fertilizer to the water prior to its distribution over the ground.

5. The apparatus of claim 1 which further comprises: means for admixing pesticide to the water prior to its distribution over the ground.

6. The apparatus of claim 1 wherein the information input to the control means by the ground mapping means is selected from the group consisting of: topography, soil texture, soil depth, nutrient distribution, weed distribution, insect distribution and soil moisture content.

7. The apparatus of claim 1 wherein the ground mapping means further comprises means for digital image processing.

8. The apparatus of claim 7 wherein the means for digital image processing further includes means for processing aerial spectral photographs.

9. The apparatus of claim 7 wherein the means for digital image processing further includes means for processing infrared imagery photographs.

10. The apparatus of claim 1 wherein the ground mapping means further comprises means for manually inputting field test data.

11. The apparatus of claim 1 wherein the means for adjusting the amount of water distributed from each sprinkler assembly further comprises:

a plurality of electrically operable shutoff valves for selectively allowing passage of water from the means for delivering water to each of the sprinkler assemblies, each valve being operatively interconnected between said means for delivering water and a sprinkler assembly means for electrically connecting each of said shutoff valves to the control means, for selective operation of said shutoff valves.

12. The apparatus of claim 11 wherein the means for electrically connecting each of said valves to the control means further comprises:

a power line interconnecting each of the shutoff valves; and a power line interface device capable of sending carrier current information signals from the control means to each of the shutoff valves.

13. An apparatus for variable application of irrigation water to a plurality of zones within a field of ground to be irrigated which comprises:

a plurality of independently operable sprinkler assemblies oriented in a fixed array relative to each other, with each of said sprinkler assemblies being operable to distribute an adjustable amount of water over a zone of ground;

means for delivering water to each of the sprinkler assemblies in the fixed array;

means for moving the fixed array of sprinkler assemblies over the ground;

control means operatively connected to the plurality of sprinkler assemblies and the means for moving the fixed array, for controlling the distribution of water over the zones of ground and variable adjusting the amount of water applied within the zones, said control means including:

(a) ground mapping means for inputting information concerning irrigation requirements for a plurality of zones within the ground to be irrigated;

(b) sprinkler assembly locator means for identifying the zonal position of each of the sprinkler assemblies in the fixed array as the fixed array is moved across the ground; and (c) means responsive to the ground mapping means and the sprinkler assembly locating means, for adjusting the amount of water distributed from each of the sprinkler assemblies as they distribute water over zones of ground; and means for variably adjusting the amount of water being distributed by each of the sprinkler assemblies.

14. The apparatus of claim 13, wherein the means for variably adjusting the amount of water being distributed by each of the sprinkler assemblies is accomplished by each of the sprinkler assemblies having more than one independently operable sprinkler oriented within the fixed array to distribute water over the same zone of ground.

15. The apparatus of claim 14 wherein the means of controlling the distribution of water over the zones of ground further comprises means for selectively operating each sprinkler of each sprinkler assembly.

16. An apparatus for variable application of irrigation water to a plurality of zones within a field of ground to be irrigated which comprises:

a plurality of sprinkler assemblies oriented in a fixed array relative to each other, with each of said sprinkler assemblies being operable to distribute an adjustable amount of water over a zone of ground;

means for delivering water to each of the sprinkler assemblies in the fixed array;

control means operatively connected to the plurality of sprinkler assemblies for controlling the distribution of water over the zones of ground and variably adjusting the amount of water applied within the zones, said control means including:

(a) ground mapping means for inputting information concerning irrigation requirements for a plurality of zones within the ground to be irrigated;

(b) sprinkler assembly locator means for identifying the zonal position of each of the sprinkler assemblies in the fixed array;

(c) means responsive to the ground mapping means and the sprinkler assembly locating means, for adjusting the amount of water distributed from each of the sprinkler assemblies as they distribute water over zones of ground.

17. The apparatus of claim 16 wherein the means for controlling the distribution of water over the zones of ground further comprises means for selectively operating each sprinkler assembly.

18. The apparatus of claim 16 which further comprises means for admixing fertilizer to the water prior to its distribution over the ground.

19. The apparatus of claim 16 which further comprises means for admixing pesticide to the water prior to its distribution over the ground.

20. The apparatus of claim 16 wherein the information input to the control means by the ground mapping means is selected from the group consisting of: topography, soil texture, soil depth, nutrient distribution, weed distribution, insect distribution and soil moisture content.

21. The apparatus of claim 16 wherein the ground mapping means further means for digital image processing.

22. The apparatus of claim 21 wherein the means for digital image processing further includes means for processing aerial spectral photographs.

23. The apparatus of claim 21 wherein the means for digital image processing further includes means for processing infrared imagery photographs.

24. The apparatus of claim 16 wherein the ground mapping means further comprises means for manually inputting field test data.

25. The apparatus of claim 16 wherein the means for adjusting the amount of water distributed from each sprinkler assembly further comprises:
 a plurality of electrically operable shutoff valves for selectively allowing passage of water from the means for delivering water to each of the sprinkler assemblies, each valve being operatively interconnected between said means for delivering water and a sprinkler assembly;
 means for electrically connecting each of said shutoff valves to the control means, for selective operation of said shutoff valves.

26. The apparatus of claim 25 wherein the means for electrically connecting each of said valves to the control means further comprises:
 a power line interconnecting each of the shutoff valves; and
 a power line interface device capable of sending carrier current information signals from the control means to each of the shutoff valves.

27. A method for applying variable amounts of irrigation water to a plurality of zones within a field of ground to be irrigated, using an irrigation system having a plurality of sprinkler assemblies oriented in a fixed array relative to each other, with each of said sprinkler assemblies being operable to distribute and adjust the amount of water sprinkled over a zone of ground, means for delivering water to each of the sprinkler assemblies in the fixed array, and means for moving the fixed array of sprinkler assemblies over the ground, and control means operatively connected to the plurality of sprinkler assemblies and the means for moving the fixed array, for controlling the distribution of water over the zones of ground, which comprises:
 inputting data, regarding selected criteria for conditions within the field into the control means;
 generating zone definitions and a map of the field regarding the criteria related to the spatial data;
 inputting data identifying the position of the sprinkler assemblies into the control means;
 testing map positions which correspond to the current sprinkler assembly positions for the generation of sprinkler control codes dependent upon the information portrayed on the map;
 generating sprinkler control codes for operating the sprinkler assemblies;
 transmitting control codes to individual sprinkler assemblies; and
 applying variable amounts of water to the area within zones according to the input data.

28. The method of claim 27 wherein the information input to the control means is selected from the group consisting of: topography, soil texture, soil depth, nutrient distribution, weed distribution, insect distribution and soil moisture content.

29. A method for applying variable amounts of irrigation water to a plurality of zones within a field of ground to be irrigated, using an irrigation system having a plurality of sprinkler assemblies oriented in a fixed array relative to each other, with each of said sprinkler assemblies being operable to distribute and adjust the amount of water sprinkled over a zone of ground, means for delivering water to each of the sprinkler assemblies in the fixed array, and means for moving the fixed array of sprinkler assemblies over the ground, and control means operatively connected to the plurality of sprinkler assemblies and the means for moving the fixed array, for controlling the distribution of water over the zones of ground, which comprises
 inputting data, regarding selected criteria for conditions within the field into the control means;
 generating zone definitions and a map of the field regarding the criteria related to the spatial data;
 generating groups of sprinkler control codes, each corresponding to pre-selected group of sprinkler positions, by testing the map positions which correspond to the sprinkler assembly positions and generating codes dependent upon the information portrayed on the map;
 inputting data identifying the position of the sprinkler assemblies into the control means;
 transmitting a group of control codes corresponding to the current sprinkler position to the sprinkler assemblies; and
 applying variable amounts of water to the area within zones according to the input data.

30. The method of claim 29 wherein the information input to the control means is selected from the group consisting of: topography, soil texture, soil depth, nutrient distribution, weed distribution, insect distribution and soil moisture content.

* * * * *